(12) United States Patent
Specht

(10) Patent No.: US 6,641,222 B2
(45) Date of Patent: Nov. 4, 2003

(54) SEAT BELT GUIDE

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 55 days.

(21) Appl. No.: 09/784,620

(22) Filed: Feb. 15, 2001

(65) Prior Publication Data

US 2001/0054839 A1 Dec. 27, 2001

(30) Foreign Application Priority Data

Mar. 10, 2000 (DE) .......................................... 100 11 725

(51) Int. Cl.[7] .............................................. A47C 31/00
(52) U.S. Cl. ..................... 297/483; 280/808; 280/801.1
(58) Field of Search .............................. 297/483, 216.1, 297/216.13, 216.14, 486, 482, 468; 280/808, 801.1, 801.2; 27/163 R, 198, 199

(56) References Cited

U.S. PATENT DOCUMENTS

| | | | |
|---|---|---|---|
| 4,005,904 A | * 2/1977 | Weman et al. .............. | 297/483 |
| 4,582,340 A | * 4/1986 | Fohl ........................ | 297/483 X |
| 5,037,135 A | 8/1991 | Kotikovsky et al. ........ | 280/808 |
| 5,096,224 A | * 3/1992 | Murakami et al. ........ | 297/483 X |
| 5,257,820 A | * 11/1993 | Kosugi ..................... | 297/483 X |
| 5,403,038 A | * 4/1995 | McFalls .................... | 280/808 |
| 5,513,880 A | 5/1996 | Ohira et al. ............... | 280/808 |
| 5,605,380 A | * 2/1997 | Gerstenberger et al. .... | 297/483 |
| 5,673,936 A | 10/1997 | Mondel ..................... | 280/808 |
| 5,732,974 A | 3/1998 | Sayles ....................... | 280/805 |
| 6,267,410 B1 | * 7/2001 | Koketsu et al. ........... | 280/801.1 |

FOREIGN PATENT DOCUMENTS

| | | |
|---|---|---|
| DE | 1780042 | 10/1970 |
| DE | 2711401 | 9/1978 |
| DE | 2854635 | 10/1980 |
| DE | 3505928 | 8/1986 |
| DE | 19808922 | 9/1998 |
| DE | 19810380 | 9/1999 |
| EP | 0240148 | 10/1987 |
| EP | 0721867 | 7/1996 |
| EP | 0941898 | 9/1999 |

* cited by examiner

Primary Examiner—Anthony D. Barfield
Assistant Examiner—Stephen Vu
(74) Attorney, Agent, or Firm—Jarett Rieger; Lonnie Drayer

(57) ABSTRACT

A seat belt guide has a bearing axis for the pivotal mounting of a guide body on a vehicle structure. The guide body has a flexing bar around which the seat belt webbing is guided. A fixing plate can be fixed on the vehicle structure pivotally around the bearing axis with a fixing bolt. Two flexing bar carriers rigidly connect the flexing bar is to the fixing plate at its two ends. The guide body is deformable when a specific load originates from the seat belt webbing, the flexing bar bending substantially symmetrically with respect to the fixing bolt.

14 Claims, 3 Drawing Sheets

SEAT BELT GUIDE

FIELD OF THE INVENTION

The present invention relates to a guide for a motor vehicle seat belt.

BACKGROUND OF THE INVENTION

A seat belt guide taught in EP 0941898 A1 has a guide body that is pivotal around a bearing axis on the vehicle structure. The guide body has a flexing bar around which seat belt webbing is guided. The flexing bar is fastened on a fixing plate at its two ends by flexing bar carriers. The fixing plate is provided with a cylindrical passage with which the guide body can be fastened to a vehicle structure to pivot around a bearing axis provided by a fixing bolt.

SUMMARY OF THE INVENTION

The present invention provides a seat belt guide having a guide body that can be deformed above a specific stress by the seat belt webbing. The flexing bar bends substantially symmetrically with respect to a bearing axis. This results in uniform bending of the flexing bar when the guide body is subjected to a stress by the seat belt in a crash. A trough in the flexing bar provides stability in a crash even if the overall size of the seat belt guide is reduced. During a crash the seat belt webbing is prevented from slipping from the flexing bar and the seat belt guide is prevented from tilting around the bearing axis.

DETAILED DESCRIPTION OF THE INVENTION

Figure 2:
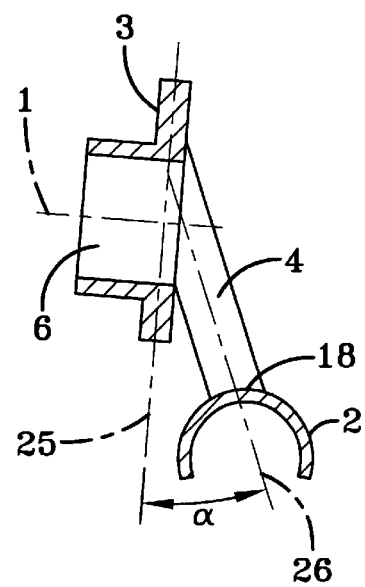
FIG. 2 is a sectional view through the embodiment in FIG. 1 along section line 2—2 in FIG. 1.
Figure 4:
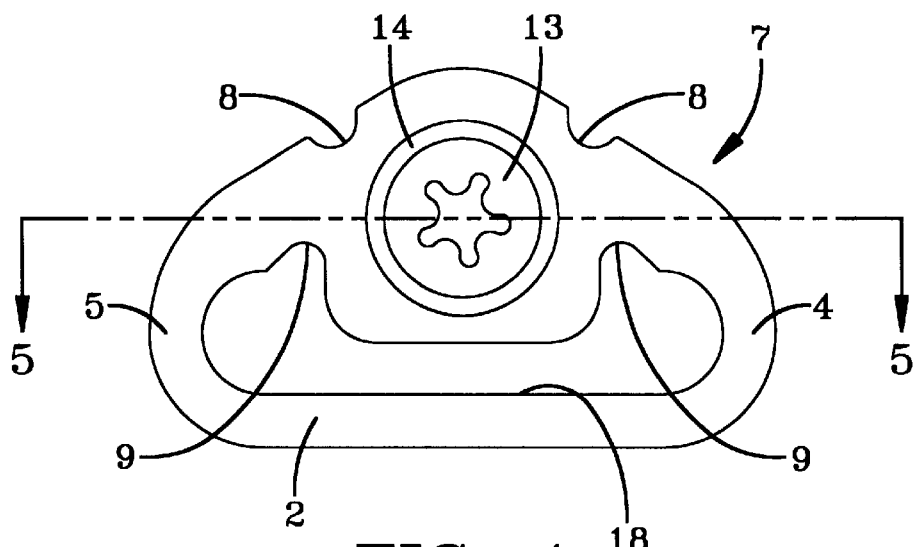
FIG. 4 shows a third embodiment of the invention.
Figure 5:
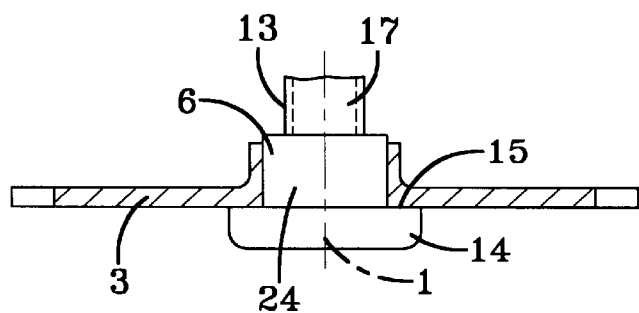
FIG. 5 is a fragmentary sectional view along section line 5—5 in FIG. 4.

The embodiments of seat belt guides shown in the figures each comprise a guide body 7 that is mountable pivotally around a bearing axis 1 on a vehicle structure, in particular in the region of the B-pillar. The bearing axis 1 is provided by a longitudinal axis of a threaded shaft 17 of a fixing bolt 13 of which an exemplary embodiment is shown in FIGS. 4 and 5. The guide body 7 comprises a fixing plate 3 with a cylindrical passage 6 therethrough that receives a threaded bolt 13 which provides a bearing axis 1 for pivotal mounting. The bearing axis 1 is coincidental with the longitudinal axis of the cylindrical passage 6. The guide body further comprises a flexing bar 2 around which the seat belt webbing (not shown) is guided. As best shown in FIG. 2, the flexing bar has a cross section in the shape of a trough. The flexing bar is connected to the fixing plate 3 at its two ends by two flexing bar carriers 4, 5.

The guide body 7 is designed such that it is deformed when a specific load, generated by a belted-in person during a crash, originates from the seat belt webbing. During this deformation, the flexing bar 2 bends substantially symmetrically with respect to the cylindrical passage 6 or the bearing axis 1. This ensures that the seat belt webbing is guided on the flexing bar with a change in the angle of extraction of seat belt webbing during the dynamic load experienced in a crash. This guidance on the flexing bar 2 is also maintained when the seat belt webbing passes through the guide body. A passage of seat belt webbing of this type can take place, for example, during the pretensioning of the seat belt or during the force-limiting yielding of the seat belt during a crash.

The desired deformation of the guide body can be achieved by weak points, in the form of notches 8–11 in the force flow zone in the regions of the junctions of the two lateral flexing bar carriers 4, 5 and the fixing plate 3 and/or flexing bar 2. A resilient lining, optionally an elastic lining, can be provided on the internal surface of the cylindrical passage 6. This allows a defined angular adjustment of the fixing plate in the direction of the interior of the vehicle in a crash. As best shown in FIGS. 4 and 5, the fixing bolt 13 can have a round head 14 with a broad support flange against the fixing plate 3. This increases security against detachment of the seat belt guide during the dynamic loading in a crash.

Figure 1:
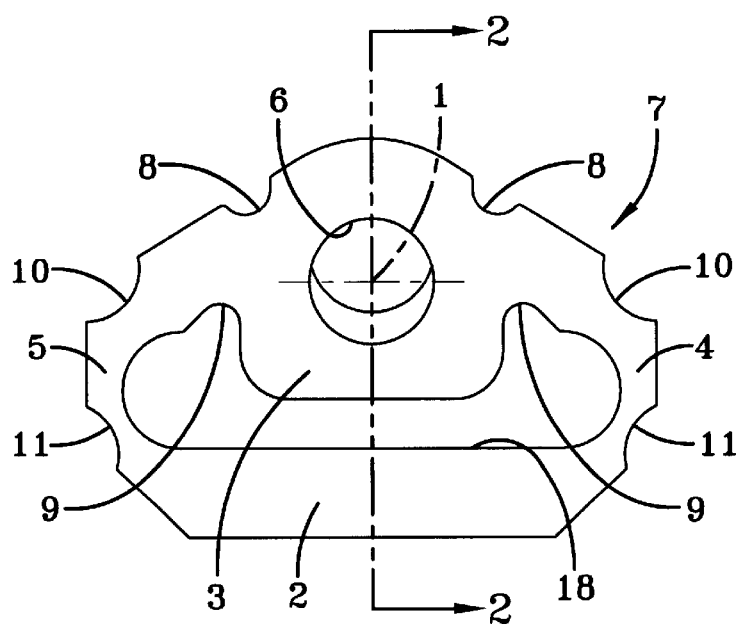
FIG. 1 shows a first embodiment of the invention.

To achieve the trough-shaped bending of the flexing bar 2 weak points 8–11, in the form of notches, can be provided in the region of the fixing plate 3 and the flexing bar carriers 4, 5. For this purpose, weak points 8, 9, for example notches, can be provided on the upper sides and/or on the undersides, for example at the transitions between the flexing bar carriers 4, 5 and the fixing plate. Other weak points 10, 11, for example notches, can be provided additionally or solely in the region of the outer contour of the flexing bar carriers. In the embodiment of FIG. 1 the weak points 8–11 are notches arranged in each case on either side of a vertical center plane passing through the guide body 7, for achieving bending of the flexing bar 2 which is symmetrical with respect to the bearing axis 1.

The angle of incidence a between the flexing bar and the fixing plate is preferably at least 15°. The angle of incidence is formed between a plane 25 located midway between the front and back surfaces of the fixing plate 3, a line passing through the highest point of the flexing bar 2 and the longitudinal axis 1 of the cylindrical passage. The angle of incidence can be up to 30°.

To contribute to the inherent deformability of the guide body 7, in particular in the region of the fixing plate 3, the angle of incidence α between the flexing bar 2 and the fixing plate 3 is relatively large and is at least 15°. This angle of incidence α can preferably be up to 30°.

An ideal deflection of the flow of force of the seat belt webbing on the flexing bar is achieved during the dynamic loading phase of a crash because of the deformability of the guide body. Due to the symmetrical bending of the flexing bar, the flexing bar helps to arrest the seat belt webbing during dynamic loading in a crash. The rotational component of the seat belt guide is obstructed only slightly in the dynamic loading phase of a crash owing to the inherent deformation of the guide body, in particular the fixing plate. The guiding of the seat belt webbing on the flexing bar is also maintained during the change in the angle of seat belt webbing extraction, which occurs during the dynamic load of a crash, even if the seat belt webbing is travelling through the seat belt guide, for example in the case of pretensioning or limiting of the belt force.

Individual adaptation of the guide body 7 which ensures undisturbed guidance of the seat belt webbing on the guide during the dynamic loading phase in a crash is achieved by the inherent deformation of the guide body from a specific load, in particular about 3 kN, depending on the configuration with which the belt is applied. A side-limiting fixing position of the seat belt webbing, by which defined seat belt webbing guidance is achieved during a crash, is produced owing to the bending of the flexing bar 2.

Figure 3:
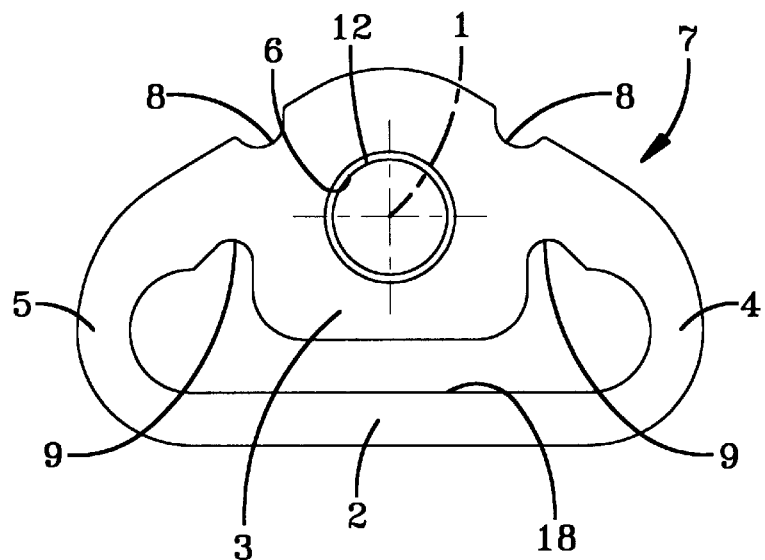
FIG. 3 shows a second embodiment of the invention.

In the embodiment shown in FIG. 3, an elastic lining 12 is provided on the internal surface of the cylindrical passage 6. The lining allows an angular adjustment, directed into the interior of the vehicle, of the fixing plate 3 in relation to the bearing axis 1 during a crash.

In FIGS. 4 and 5, the fixing bolt 13 forms the bearing axis 1 with a round shaft 17 and a bolt head 14 and is placed through the cylindrical passage 6. The bolt head 14 is round with a wide support face 15 adjoining the fixing plate 3. The cylindrical passage 6 inhibits an angular offset of the bearing parts with which the fixing plate 3 is mounted pivotally around the bearing axis 1 so that the rotation of the guide body 7 around the bearing axis 1 is maintained without obstruction.

The guide body 7 can be formed in one piece and can preferably is a stamped and bent sheet metal part. With a two-piece design of the guide body, the flexing bar and the two flexing bar carriers can be formed from a profile rod 19 which is rounded at least in the region of the deflecting face and is connected to the fixing plate 3 by welding. For this purpose, the fixing plate can comprise connecting bosses 20 to which the ends, bent as flexing bar carriers, of the profile rod forming the flexing bar are welded.

A guide body 7 produced from one piece as a stamped and bent sheet steel part is preferably used in the embodiments in FIGS. 1 to 5. The embodiments of the guide body 7 shown in FIGS. 6 to 9 comprise two parts. One part contains the fixing plate 3 with the cylindrical passage 6 and connecting bosses to which there is connected, by welding, a profile rod 19 or wire which forms the flexing bar 2 in its central part and the flexing bar carriers 4, 5 with bent side parts. The bent ends are rigidly connected to the connecting bosses of the fixing plate 3.

Figure 6:
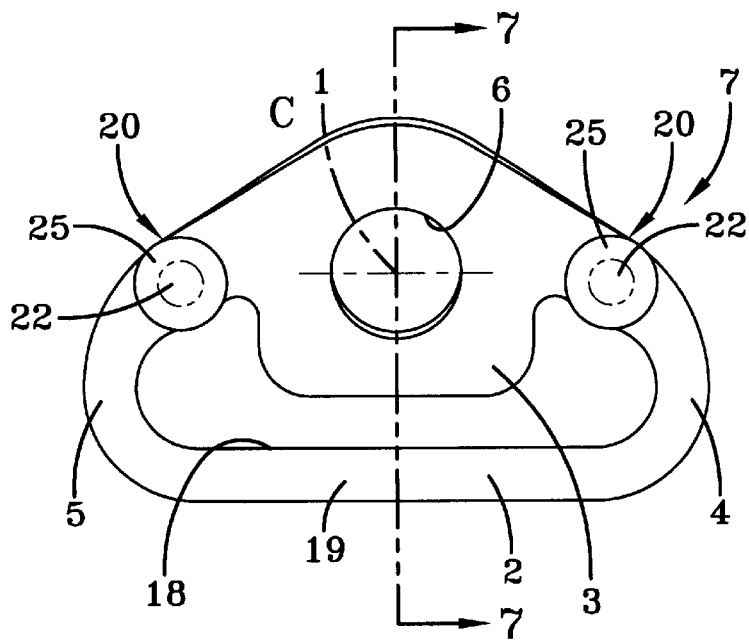
FIG. 6 shows a further embodiment of the invention.
Figure 7:
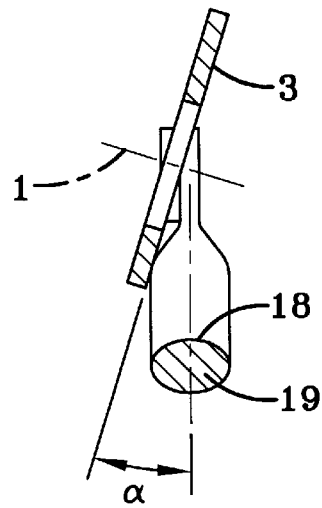
FIG. 7 is a sectional view along section line 7—7 in FIG. 6.

In the embodiment of FIGS. 6 and 7, flat connecting bosses 20 are formed onto either side of the fixing plate 3. The end regions 25 of the flexing bar carriers 4, 5 are also flattened and are connected to these connecting bosses 20, preferably by spot welding. The spot welds 22 are located in the flattened end regions 25 of the flexing bar carriers 4, 5 which are connected on the flat connecting bosses 20 formed on the fixing plate 3 in an offset manner. As shown in FIG. 7, the angle of offset which the connecting bosses 20 adopt in relation to the plane of the fixing plate 3 determines the angle of incidence α between the bent profile rod 19 forming the flexing bar carriers 4, 5, and the flexing bar 2.

Figure 8:
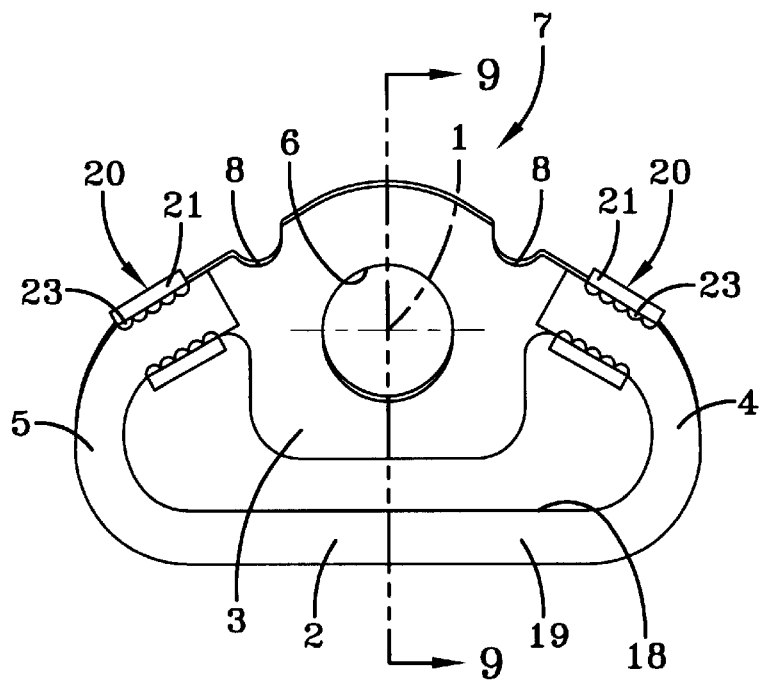
FIG. 8 shows a further embodiment of the invention.
Figure 9:
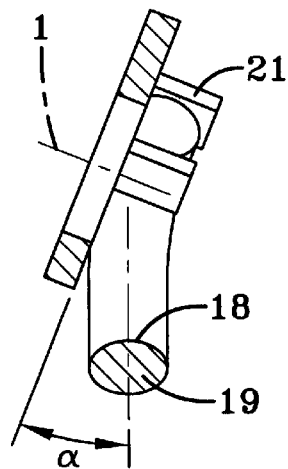
FIG. 9 is a sectional view along section line 9—9 in FIG. 8.

In the embodiment shown in FIGS. 8 and 9, two U-shaped connecting fixtures 21 are formed on the fixing plate 3. The ends of the profile rods, bent in relation to the flexing bar carriers 4, 5, of the profile rod 19 are rigidly connected to the U-shaped connecting fixtures 21 by seam welds 23.

As shown in FIG. 9, the angle of incidence α between the flexing bar 2 and the flexing bar carriers 4, 5 in relation to the plane of the fixing plate 3 is determined by offsets in the profile rod 19 between the seam welds 23 and the flexing bar carriers 4, 5.

In the embodiments in FIGS. 6 to 9, the profile rod 19 preferably comprises a flattened steel profile, the seat belt webbing deflecting region at the top, in which the deflecting line 18 extends, being rounded. The profile rod 19 can have an elliptical cross-section, the major axis of the ellipse extending substantially horizontally and the minor axis of the ellipse extending substantially vertically, as shown in FIGS. 7 and 9. The profile can also be flattened on the underside. The desired deformation of the flexing bar 2 a crash can be achieved by corresponding dimensioning with such a design of the profile rod 19.

The seat belt guide can be dimensioned such that it can be arranged in a concealed manner, i.e. within the lining of the B-pillar of a motor vehicle. The dimensions suitable for this purpose are such that the external dimensions of the guide body 7 do not project beyond a circle, concentric with the center of the cylindrical passage 6, with a radius of about 45 mm. The outermost dimensions of the guide body 7 lie on a circle with a radius of about 42 mm drawn around the center of the cylindrical passage or within this circle. The lever arm between the bearing axis and the flexing bar is also enlarged, that is to say the distance along the deflecting line 18 of the flexing bar 2 and the center of the cylindrical passage 6, is about 26 mm. The deflecting line is that line 18 which passing through the highest point of the flexing bar 2 and the longitudinal axis 1 of the cylindrical passage. The pivot angle of the guide body 7 can be reduced to about 24° on application of the seat belt, in particular owing to the relatively great distance between the flexing bar and the center of the cylindrical passage 6, i.e. the bearing axis 1. This improves the introduction of force into the seat belt guide during a crash.

While certain representative embodiments and details have been presented for the purpose of illustrating the invention, it will be apparent to those skilled in the art that various changes and modifications may be made therein without departing from the spirit and scope of the invention.

I claim:

1. A seat belt guide comprising a guide body having a flexing bar around which a seat belt webbing can be guided, the flexing bar having two ends, a fixing plate fixed to a vehicle structure around the longitudinal axis of a cylindrical passage through the fixing plate, two flexing bar carriers connecting the flexing bar at said two ends to the fixing plate, weak points having a deformation of the guide body defining in a region of the fixing plate and the two flexing bar carriers, the weak points having notches and arranged symmetrically with respect to a vertical center lane of the guide body, and an angle of incidence between the flexing bar and the fixing plate being at least 15°, the angle of incidence being formed between a plane located midway between front and back surfaces of the fixing plate and parallel to said surfaces, and a line passing through a highest point of the flexing bar and the longitudinal axis of the cylindrical passage.

2. The seat belt guide according to claim 1 wherein the angle of incidence is 15° to 30°.

3. The seat belt guide according to claim 1 wherein external dimensions of the guide body lie within a circle that is concentric with the center of the cylindrical passage, the circle having a radius of about 42 mm and the distance along a deflecting line between the flexing bar and the center of the cylindrical passage is about 26 mm.

4. The seat belt guide according to claim 1 wherein an internal face of the cylindrical passage has a resilient, elastic lining.

5. The seat belt guide according to claim 1 further comprising a fixing bolt passing through the cylindrical passage, the fixing bolt providing a bearing axis that is coincidental with the longitudinal axis of the cylindrical passage, the fixing bolt having a round head with a flange adjoining the fixing plate.

6. The seat belt guide according to claim 1 wherein the guide body is a one-piece, stamped and bent sheet steel part.

7. The seat belt guide according to claim 1 wherein the guide body comprises two pieces including said flexing bar which is at least a partially rounded profile rod connected to the fixing plate by welding.

8. The seat belt guide according to claim 7 wherein the profile rod has a greater diameter in the horizontal direction than in the vertical direction.

9. The seat belt guide according to claim 7 wherein to which the flexing bar is connected by welding to connecting bosses that are formed on the fixing plate.

10. The seat belt guide according to claim 9 wherein the connecting bosses have an offset, forming the angle of incidence, in relation to the fixing plate.

11. The seat belt guide according to claim 1 wherein connecting fixtures are U-shaped.

12. The seat belt guide according to claim 7 wherein the flexing bar carriers are formed by bent rod ends of the profile rod.

13. The seat belt guide according to claim 12 wherein the profile rod has an offset, forming the angle of incidence, in the region of the bent rod ends.

14. The seat belt guide according to claim 12 wherein the rod ends are flattened in the region of the welds.

* * * * *